Feb. 9, 1971 — H. O. BANKS ETAL — 3,561,224

THERMOELECTRIC TEMPERATURE CONTROLLER

Filed June 7, 1967

Hampden O. Banks
Kenneth K. Tang
INVENTORS

BY Edward Dugas
AGENT

HEAT PUMP-OFF
AMBIENT — COLD
HEAT SOURCE WARMS BATTERY

HEAT PUMP-HEATING BATTERY
AMBIENT — VERY COLD
HEAT SOURCE WARMS BATTERY

HEAT PUMP-COOLING BATTERY
AMBIENT — WARM
HEAT SOURCE WARMS BATTERY

HEAT PUMP-GENERATING
AMBIENT — COLD
HEAT SOURCE WARMS BATTERY

Hampden O. Banks
Kenneth K. Tang
INVENTORS

BY *Edward Dugas*
AGENT

United States Patent Office 3,561,224
Patented Feb. 9, 1971

3,561,224
THERMOELECTRIC TEMPERATURE
CONTROLLER
Hampden O. Banks, Westminster, and Kenneth K. Tang, Los Angeles, Calif., assignors to TRW Inc., Redondo Beach, Calif., a corporation of Ohio
Filed June 7, 1967, Ser. No. 644,327
Int. Cl. F25b 21/02
U.S. Cl. 62—3       7 Claims

ABSTRACT OF THE DISCLOSURE

A device such as a battery has its temperature maintained within a selective range by providing a source of continuous heat, and a thermoelectric means is thermally connected between the continuous heat source and a heat sink. The thermoelectric means augments the heat source by adding heat to the battery when the ambient temperature is low and cools, or draws heat away from, the continuous heat source and the battery when the ambient temperature is high.

BACKGROUND OF THE INVENTION

This invention pertains to the field of temperature-controlling devices and, more particularly, the invention is concerned with thermoelectric temperature control in combination with a constant heat source for maintaining the temperature of a desired device to within predetermined levels. Various types of heat transfer devices exist in the prior art for dissipating heat from electronic equipment and the like and for maintaining the temperature of the equipment within a predetermined range of values. One such device is disclosed in U.S. patent application Ser. No. 642,098, filed May 29, 1967, and assigned also to the assignee of the present patent. In that application, a continuous heat source such as an isotope heat source is contained in a base plate onto which devices such as batteries are mounted. The base plate is provided with bi-metallic activated heat transfer switch means so as to provide a variable heat path to a heat sink in a controlled manner, thereby dissipating or drawing off heat from the continuous heat source when the temperature of the device rises above a predetermined level. It would be highly desirable to have a means of increasing the efficiency of the heat sink, thereby enabling a greater temperature range, or to have a means of generating a hot or a cold spot which is in contact with the heat sink, thereby increasing the efficiency of the heat sink.

SUMMARY OF THE INVENTION

In a preferred embodiment of the invention, the desirable feature of having a hot or a cold point or improving the efficiency of a heat sink is achieved by utilizing a thermoelectric which is thermally connected to the heat sink so as to draw heat from or to provide supplemental heat to the continuous heat source. The power to operate the thermoelectric may be taken directly from the battery itself such that the battery uses a portion of its own stored electrical energy in order to maintain its temperature within the predetermined level. The continuous heat source, which may be an isotope type heat source, is in thermal contact with the battery and is providing a continuous source of heat to the battery. The thermoelectric is electrically connected to the battery through a temperature sensitive switch which, when activated, applies a potential to the thermoelectric with a correct polarity such that the thermoelectric either generates a cold spot or a hot spot at the heat sink. In other words, when it is necessary to provide additional heat above that supplied by the continuous heat source, the properly polarized potential is sent to the thermoelectric and it commences to generate heat or supply heat into the immediate battery area. If the temperature switch indicates that the battery temperature is above a predetermined maximum level, then the polarity of the voltage applied to the thermoelectric module is reversed and it, in turn, provides a cold area which draws heat from the battery area and transfers it to the heat sink.

Further details of these and other novel features of the present invention will become more apparent when taken in conjunction with the following description and drawings, throughout which like characters indicate like parts, and which drawings form a part of this application.

DESCRIPTION OF THE PREFERRED EMBODIMENT

Figure 1:
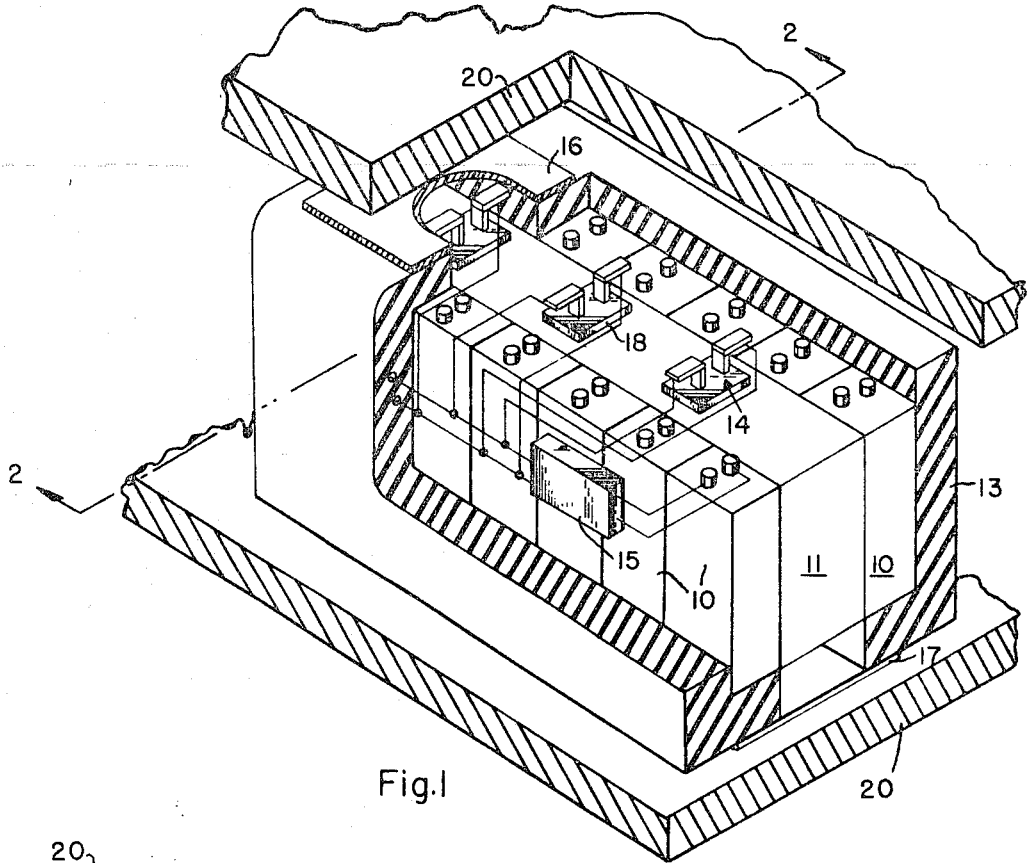
FIG. 1 illustrates in projection view, partially sectioned, an example of thermoelectric temperature controller apparatus constructed in accordance with the principles of the present invention.
Figure 2:
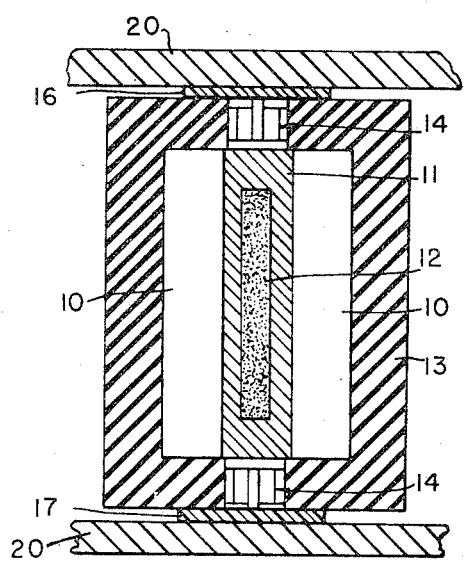
FIG. 2 illustrates a sectioned view of the embodiment of FIG. 1 taken along the sectioning lines 2—2.

Referring to FIGS. 1 and 2, a plurality of battery cells 10 are positioned on opposite sides of a rectangular heat sink plate 11. Inserted in the plate 11 are constant heat sources 12 which may be isotope cylinders. The heat sources provide a constant source of heat which is uniformly distributed to the batteries through the heat sink plate 11. Mounted to the top and/or bottom of the heat sink plate 11 are thermoelectric modules 14 which are alternately spaced between the isotope heaters 12. Thermally conductive but electrically insulated plates 16 and 17 thermally connect the thermoelectric modules 14 to a heat sink 20 which may be in practical application the structure members of a space vehicle. The batteries are encased within a thermal insulating material 13 so as to protect the batteries from adverse ambient conditions and to preserve heat within the immediate battery area. A thermoelectric switch 15 is connected to draw power from the batteries 10 and to direct that power in the correct polarity to the thermoelectric modules 14. A thermoelectric module has the property that, when current is passed through it in one direction, one end of its terminals becomes cold with respect to the other, and when it is passed through the terminals in an opposite direction, a temperature reversal takes place. Therefore, by controlling the temperature at which the thermoelectric switch directs the power through the thermoelectric modules, it is possible to control the temperature of the batteries to within a predetermined range. Thus it may be understood that the batteries 10 are thermally indirectly coupled to the thermoelectric modules 14.

Figure 3:
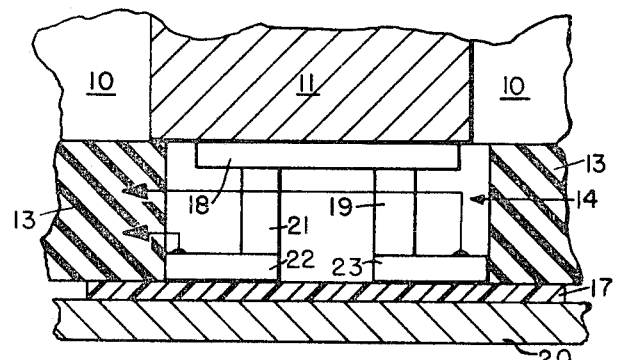
FIG. 3 is an enlarged sectional view of a portion of the embodiment illustrated in FIG. 2.

Referring now to FIG. 3, which is an enlarged view of one of the bottom thermoelectric modules 14, which is thermally connected between the heat sink 20 and the heat sink plate 11. The active elements of the thermoelectric are bars 19 and 21 which are comprised of a P and N-doped type semiconductive element such as bismuth telluride, lead telluride or germanium silicon. A metal plate 18, which may be arinco iron, thermally and electrically connects the active elements 19 and 21 to each other and to the heat sink plate 11. Electrical connecting bars 22 and 23 are connected to semiconductive elements 21 and 19, respectively. The potential lead-in wires from the thermoelectric switch 15 are electrically connected one to each bar 22 and 23. The bars 22 and 23 are thermally connected to the electrically insulating plate 17, which may be mica, which prevents the bars 22 and 23 from being shorted out by contact with the heat sink 20. The insulating plate 17 still allows thermal transmission from the bars 22 and 23 to the heat sink 20.

Figure 4A:
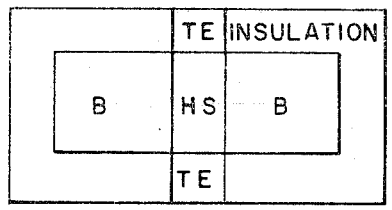
FIGS. 4a through 4d are charts illustrating the temperature control cycle of the preferred embodiment of the invention.

In FIGS. 4a through 4d the four modes of operation that are possible with this particular device are shown. In FIG. 4a the quiescent condition wherein the thermoelectric modules are not producing any heat or dissipating any heat by electrical excitation is indicated; the ambient temperature is cold and the heat source supplies energy to the battery to warm it and to maintain the temperature of the battery above a predetermined minimum level. Excess heat drains away through insulation and thermoelectric elements.

Figure 4B:
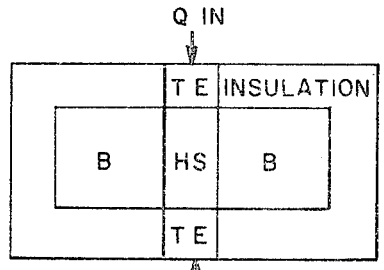

In FIG. 4b, the ambient temperature is insufficient to maintain the temperature of the battery above the predetermined minimum level. The thermoelectric module is then activated, drawing power from the battery itself, or from some external source, to apply heat into the heat sink to augment the constant heat source and provide additional heat to the batteries. Once the temperature of the batteries has reached the predetermined level, the thermoelectric modules are switched off and the constant heat source continues on, warming the battery until the temperature of the battery again falls below the minimum predetermined level, at which time the thermoelectric modules are again turned on to bring the temperature of the batteries up to the required temperature level.

Figure 4C:
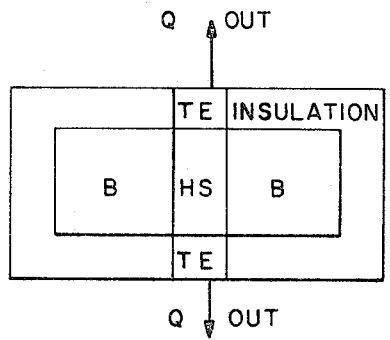
Figure 4D:
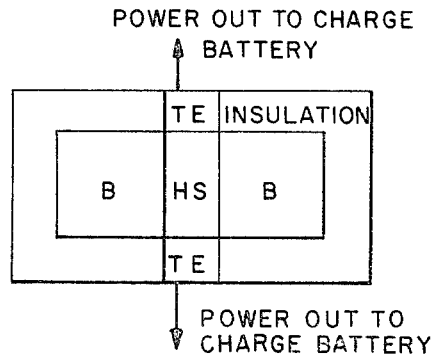

In FIG. 4c, the ambient temperature is warm, the heat source is continually applying heat to the battery, the thermoelectric module is activated so as to pump heat out of the heat sink area and in turn out of the battery area so as to cool the battery; or, in other words, a cold point is created in the battery area. In FIG. 4d, the ambient temperature is moderately cold, the heat source is adequate for warming the battery, and the thermoelectric modules are receiving heat from the battery and converting it into electrical energy so as to trickle charge the battery. This particular mode of operation can also be utilized when temperature conditions are overriden by the necessity for maintaining the charge on the batteries at a predetermined level.

It will be apparent to those persons skilled in the art that many physical configurations may be utilized while still embodying the inventive concept disclosed herein. For example, the battery cells, if cylindrical in shape, instead of being placed in line on opposite sides of a heat sink plate, could be grouped cylindrically around a cylindrically shaped constant heat source located at the axial center of the group and the battery cells may be grouped around the outer circumference of the cylinder with the insulating material external to and encapsulating the entire assembly. Penetrations in insulation would expose thermoelectric element ends for control to heat sink. In some mission applications, it is feasible to eliminate the constant heat source and rely solely upon thermoelectric heating or cooling because external sources of heat, such as the sun, are available and can, in fact, provide heat to keep the batteries above the predetermined minimum operating value. Here, cooling is of chief concern.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. Temperature controller apparatus for maintaining the temperature of a battery within predetermined limits comprising:

continuous heat source means thermally coupled to said battery;

thermoelectric means thermally indirectly coupled to said battery; and thermally actuated electric switching means electrically inter-connected between said battery and said thermoelectric means whereby (1) when the temperature of said battery is below a predetermined magnitude, said thermoelectric means is energized from said battery to supply additional thermal energy thereto and (2) when the temperature of said battery is above a predetermined magnitude, said thermoelectric means is energized from said battery to transfer heat therefrom.

2. The invention according to claim 1 which further comprises thermal insulating means encasing a substantial portion of said battery, said continuous heat source means, and said thermoelectric means.

3. The invention according to claim 1 wherein said thermoelectric means comprises P and N-Doped semiconductors containing bismuth teluride.

4. The invention according to claim 1 wherein said thermoelectric means comprises P and N-Doped semiconductors containing at least one alloy of lead and telurium.

5. The invention according to claim 1 wherein said thermoelectric means comprises P and N-Doped semiconductors of germanium and silicon.

6. The invention according to claim 1 in which said thermoelectric means is of the character for generating a charging voltage from the heat of said battery and in which said thermally actuated electric switching means is of the character to connect said thermoelectric means in circuit with said battery in a manner to trickle charge said battery.

7. The invention according to claim 6 wherein said thermoelectric means comprises P and N-Doped semiconductors of bismuth teluride.

References Cited

UNITED STATES PATENTS

| | | | |
|---|---|---|---|
| 2,881,594 | 4/1959 | Hopkins | 62—3 |
| 2,886,618 | 5/1959 | Goldsmid | 62—3 |
| 3,008,890 | 11/1961 | Bartnoff | 62—3 |
| 3,087,309 | 4/1963 | Toulmin | 62—3 |
| 3,111,008 | 11/1963 | Nelson | 62—3 |
| 3,127,286 | 3/1964 | Henderson | 62—3 |
| 3,170,117 | 2/1965 | Berning | 62—3 |
| 3,256,702 | 6/1966 | Henderson | 62—3 |
| 3,316,474 | 4/1967 | Lode | 36—204X |

WILLIAM J. WYE, Primary Examiner

U.S. Cl. X.R.

136—203